United States Patent
Busche et al.

(10) Patent No.: US 6,430,547 B1
(45) Date of Patent: Aug. 6, 2002

(54) METHOD AND SYSTEM FOR INTEGRATING SPATIAL ANALYSIS AND DATA MINING ANALYSIS TO ASCERTAIN RELATIONSHIPS BETWEEN COLLECTED SAMPLES AND GEOLOGY WITH REMOTELY SENSED DATA

(75) Inventors: Frederick D. Busche, Highland Village; Alexander Darius Zekulin, Flower Mound, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/400,776

(22) Filed: Sep. 22, 1999

(51) Int. Cl.$^7$ ............................................... G06F 17/30
(52) U.S. Cl. ............................................... 707/1; 702/9
(58) Field of Search ........................ 707/1, 100; 702/3, 702/6, 9, 190; 701/28, 202, 208, 300; 342/357.14; 367/14, 15, 23, 82

(56) References Cited

U.S. PATENT DOCUMENTS 4,794,534 A * 12/1988 Millheim ........................ 702/9

\* cited by examiner

Primary Examiner—Safet Metjahic
Assistant Examiner—Apul Mofiz
(74) Attorney, Agent, or Firm—Gregory M. Doudnikoff; Carstens, Yee & Cahoon, L.L.P.

(57) ABSTRACT

A method and system for ascertaining relationships between collected geological samples and remotely sensed geological data within a region is provided. The locations of physical samples and the locations of data points associated with remotely sensed data are identified and stored. The locations within the region are determined using a position identifying system, such as the global positioning system. The collected physical samples are analyzed to obtain data values for physical and chemical properties of the collected samples. Data mining algorithms are used to generate input data for the formulation of a set of spatial relationships. The locations of the physical samples within the region are associated with the locations of the remotely sensed data to form a set of spatial relationships. Spatial analysis techniques are used to provide understanding of this set of spatial relationships and how they relate to the location of either an economically viable mineral resource or the position of hidden subsurface contaminants and the understanding of their potential migration paths.

18 Claims, 4 Drawing Sheets

METHOD AND SYSTEM FOR INTEGRATING SPATIAL ANALYSIS AND DATA MINING ANALYSIS TO ASCERTAIN RELATIONSHIPS BETWEEN COLLECTED SAMPLES AND GEOLOGY WITH REMOTELY SENSED DATA

CROSS REFERENCE TO RELATED APPLICATIONS

The present invention is related to the following applications entitled "METHOD AND SYSTEM FOR INTEGRATING SPATIAL ANALYSIS AND DATA MINING ANALYSIS TO ASCERTAIN FAVORABLE POSITIONING OF PRODUCTS IN A RETAIL ENVIRONMENT", U.S. application Ser. No. 09/400,583; and "METHOD AND SYSTEM FOR INTEGRATING SPATIAL ANALYSIS AND DATA MINING ANALYSIS TO ASCERTAIN WARRANTY ISSUES ASSOCIATED WITH TRANSPORTATION PRODUCTS", U.S. application Ser. No. 09/401,109; all of which are filed even date hereof, assigned to the same assignee, and incorporated herein by reference.

BACKGROUND OF THE INVENTION

1. Technical Field

The present invention relates to an improved data processing system and, in particular, to a method and system for a specific scientific application of database processing.

2. Description of Related Art

As businesses become more productive and profit margins seem to be reduced, it is important for businesses to make productive use of all assets. Businesses have tried to increase the value of information assets by spending more money on information technology that allow people to generate knowledge from the information surrounding a business.

In oil and mining businesses, geologists constantly desire a better understanding of the geology of a region. Information technology expenditures have enabled spatial analysis to be used to visualize the large amounts of data collected using digital instruments and stored in various databases. For example, remote measurements of gravity, magnetics, and various spectra retrieved from these databases may be placed into three-dimensional models in which geologists may view the relative positions of various geologic features. In a similar manner, ground-based measurements of seismic and well-logging data may also be spatially analyzed.

To gather more information or to confirm the predictions of spatial models created from other information, geologists also gather physical samples of rocks, soil, water, pore space liquids, and plants and analyze them for their chemical properties. These samples may also be analyzed for physical properties using laboratory instruments, and the data output from these instruments may be digitally stored as representations of these properties in various databases. Other information associated with a sample, such as the location at which the sample was collected, the person who collected the sample, any instruments used to collect the sample, and various conditions under which the sample was collected may be stored in another database.

Generally, the results of these analyses are presented to a human expert who attempts to mentally correlate the multiple analyses with geologic maps and remotely sensed data such that the value of a property may be assessed. In addition to the difficulty of such correlation, the information concerning the physical samples may be stored in multiple databases. In an attempt to help the human expert, the sample information may be processed using statistical analysis to discover trends in the sample data.

Other relationships between the geologic data and the remotely sensed data and the sample data could be discovered if the proper methodologies could be applied that relied less on the expertise of the expert and more on the discovery of hidden relationships in the data. Therefore, it would be advantageous to provide a method and system for data analysis that discovers these relationships in the data between geological samples collected in the field and other data gathered during geophysical and geochemical surveying or remote sensing of the region from which the samples were collected.

SUMMARY OF THE INVENTION

A method and system for ascertaining relationships between collected geological samples and remotely sensed geological data within a region is provided. The locations of physical samples and the locations of data points associated with remotely sensed data are identified and stored. The locations within the region are determined using a position identifying system, such as the global positioning system. The collected physical samples are analyzed to obtain data values for physical and chemical properties of the collected samples. Data mining algorithms are used to generate input data for spatial analysis. Data mining algorithms are used to delineate hidden relationships between attributes within the data from all sources as a precursor to looking for a set of spatial relationships of that data to mineral deposits. The locations of the physical samples within the region are associated with the locations of the remotely sensed data to form a set of spatial relationships.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
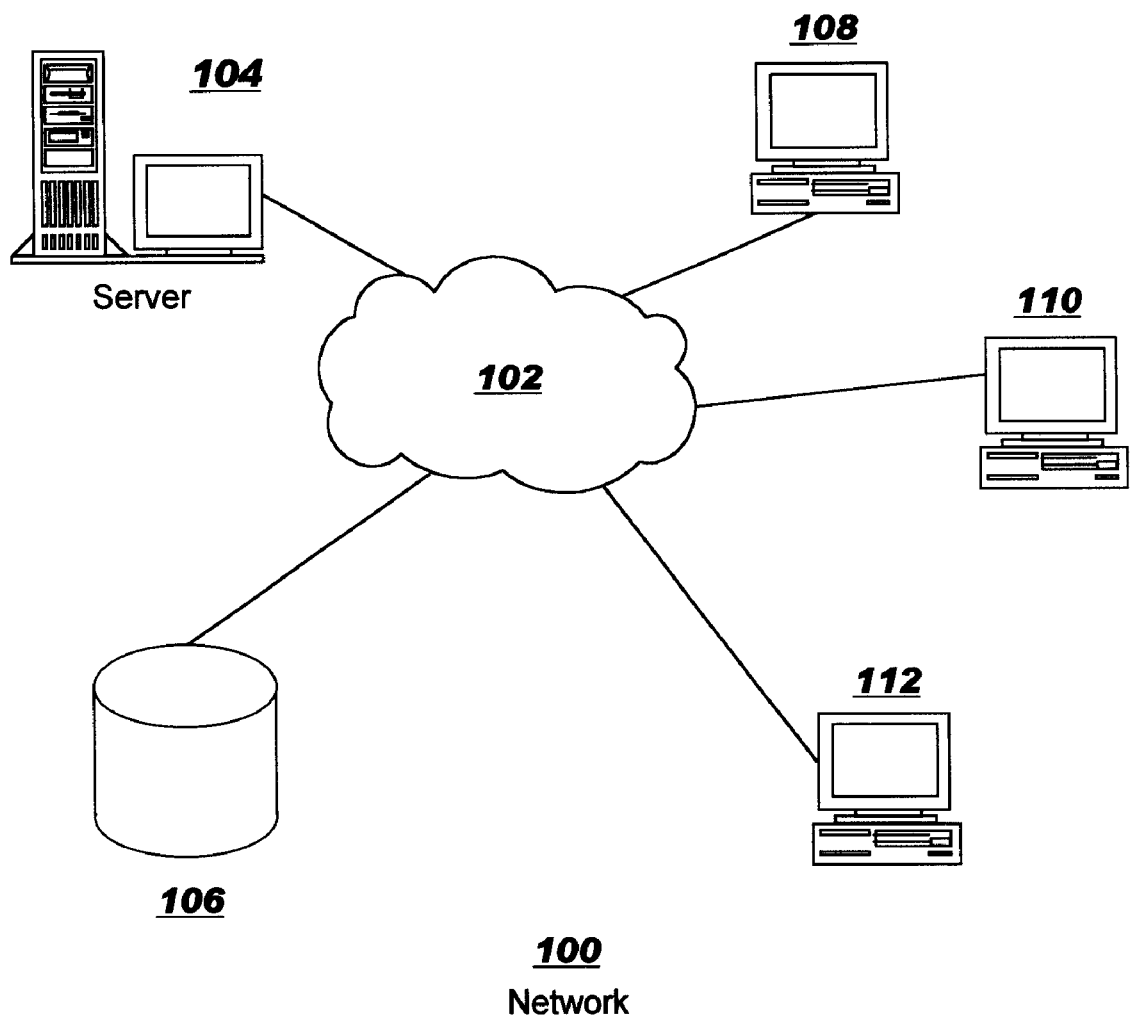
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or point-of-sale systems, such as electronic cash registers. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
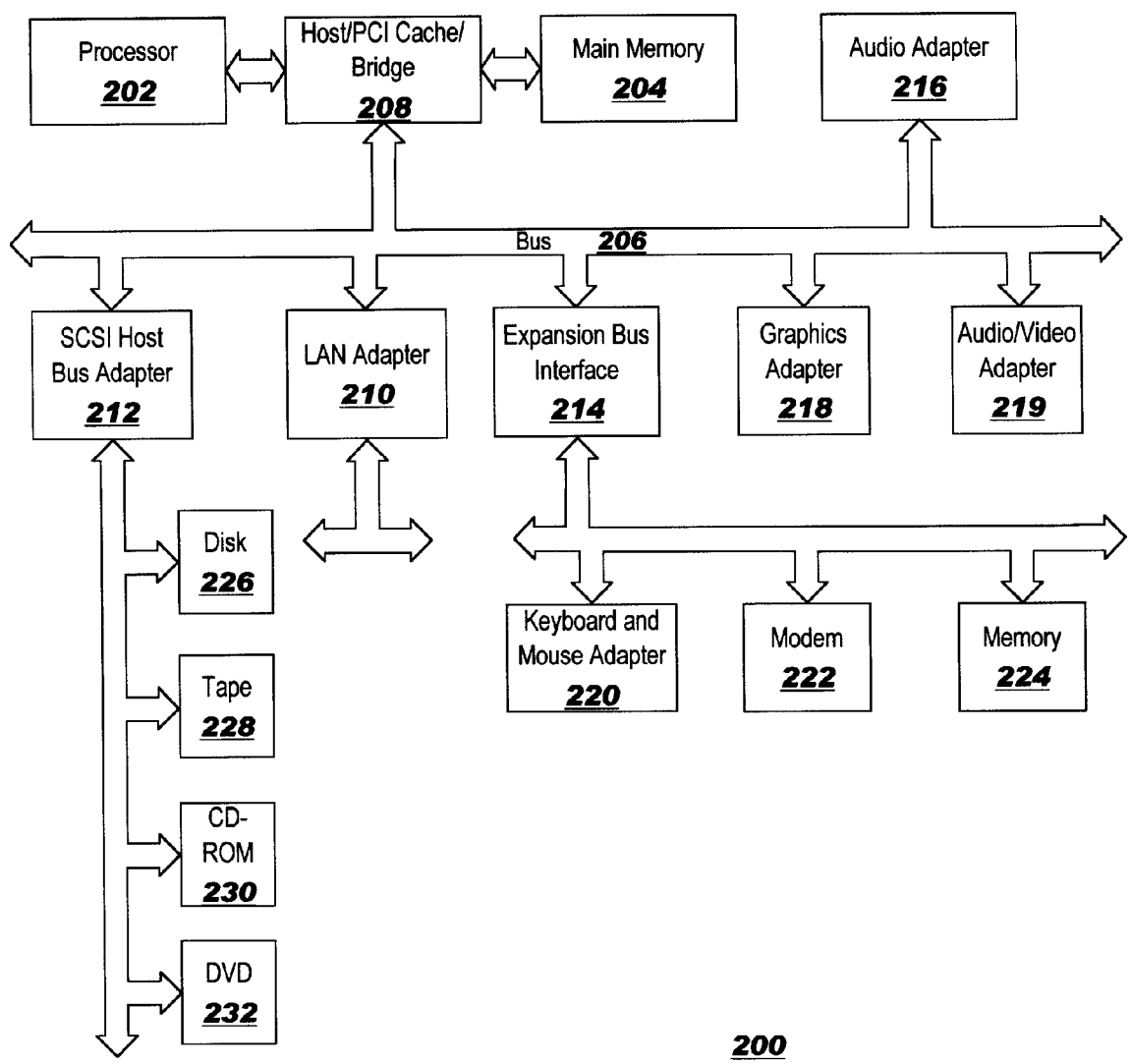
FIG. 2 is a block diagram illustrating a data processing system in which the present invention may be implemented.

With reference now to FIG. 2, a block diagram illustrates a data processing system in which the present invention may be implemented. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors. An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention ma y be applied to multiprocessor data processing systems.

Data mining allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information.

As the present invention relies extensively on the relatively new field of data mining and uses data mining algorithms without proffering a new data mining algorithm per se, a discussion of the general techniques and purposes of data mining are herein provided before a detailed discussion of the implementation of the present invention.

Background on Data Mining

Data mining is a process for extracting relationships in data stored in database systems. As is well-known, users can query a database system for low-level information, such as how the value of a particular property in a core sample drilled during the last month. Data mining systems, on the other hand, can build a set of high-level rules about a set of data, such as "If the core sample is from the Ogallala Sandstone from West Texas and the amount of lead contained in the sample is 0.5%, and there is a projected magnetic anomaly of 2 gammas within 50 feet vertically of where the sample was taken, then the probability of the sample containing at least 0.5% zinc is greater than 80%." These rules allow a geologist to better understand the relationship between geologic, geophysical and geochemical data and allow a geologist to make queries, such as "Where should I take my next core sample that would have the highest probability of intersecting an area containing a high concentration of silver?" This type of knowledge allows for targeted drilling and helps to guide other strategic decisions. Other applications of data mining include finance, market data analysis, medical diagnosis, scientific tasks, VLSI design, analysis of manufacturing processes, etc. Data mining involves many aspects of computing, including, but not limited to, database theory, statistical analysis, artificial intelligence, and parallel/distributed computing.

Data mining may be categorized into several tasks, such as association, classification, and clustering. There are also several knowledge discovery paradigms, such as rule induction, instance-based learning, neural networks, and genetic algorithms. Many combinations of data mining tasks and knowledge discovery paradigms are possible within a single application.

Data Mining Tasks

An association rule can be developed based on a set of data for which an attribute is determined to be either present or absent. For example, suppose data has been collected on a set of core samples and the attributes are whether specific samples contain zinc or do not contain zinc for each of the samples. The goal is to discover any association rules between the existence of zinc concentrations within the samples. Specifically, given two non-intersecting sets of items, e.g., sets X and Y, one may attempt to discover whether there is a rule "if X was 1 percent zinc, then Y was 1 percent zinc," and the rule is assigned a measure of support and a measure of confidence that is equal or greater than some selected minimum levels. The measure of support is the ratio of the number of records where both X and Y contain 1 percent zinc divided by the total number of records. The measure of confidence is the ratio of the number of records where both X and Y contain 1 percent zinc divided by the number of records where X contains 1 percent zinc. Due to the smaller number of samples in the denominators of these ratios, the minimum acceptable confidence level is higher than the minimum acceptable support level. Returning to geological samples as an example, the minimum support level may be set at 0.3 and the minimum confidence level set at 0.8. An example rule in a set of core sample information that meets these criteria might be "if the core sample has 1 percent zinc, then the core sample has 2 percent lead."

Given a set of data and a set of criteria, the process of determining associations is completely deterministic. Since there are a large number of subsets possible for a given set of data and a large amount of information to be processed, most research has focused on developing efficient algorithms to find all associations. However, this type of inquiry leads to the following question: Are all discovered associations really significant? Although some rules may be interesting, one finds that most rules may be uninteresting since there is no cause and effect relationship. For example, the association "if the core sample has 1 percent zinc, then the core sample has 2 percent lead" would also be a reported association with exactly the same support and confidence values as the association "if the core sample has 2 percent lead, then the core sample has 1 percent zinc," even though one cannot state that the concentration of one element caused the concentration of another element.

Classification tries to discover rules that predict whether a record belongs to a particular class based on the values of certain attributes. In other words, given a set of attributes, one attribute is selected as the "goal," and one desires to find a set of "predicting" attributes from the remaining attributes. For example, suppose it is desired to know whether a particular area may be prospected for a gold deposit based on the geology of the region of origin and the type of rock within the sample. For example, a rather trivial example of this type of rule could include "If the sample is a sandstone sample from Carlin, Nev., then it will not contain gold." A set of data is presented to the system based on past knowledge; this data "trains" the system. The goal is to produce rules that will predict behavior for a future class of data. The main task is to design effective algorithms that discover high quality knowledge. Unlike an association in which one may develop definitive measures for support and confidence, it is much more difficult to determine the quality of a discovered rule based on classification.

A problem with classification is that a rule may, in fact, be a good predictor of actual behavior but not a perfect predictor for every single instance. One way to overcome this problem is to cluster data before trying to discover classification rules. To understand clustering, consider a simple case were two attributes are considered: concentration of lead and concentration of zinc within a region. These data points can be plotted on a two-dimensional graph. Given this plot, clustering is an attempt to discover or "invent" new classes based on groupings of similar records. For example, for the above attributes, a clustering of data in the range of 1.0–1.5% of zinc might be found for 2.0–2.5% lead. This cluster could then be treated as a single class. Clusters of data represent subsets of data where members behave similarly but not necessarily the same as the entire population. In discovering clusters, all attributes are considered equally relevant. Assessing the quality of discovered clusters is often a subjective process. Clustering is often used for data exploration and data summarization.

Knowledge Discovery Paradigms

There are a variety of knowledge discovery paradigms, some guided by human users, e.g. rule induction and decision trees, and some based on AI techniques, e.g. neural networks. The choice of the most appropriate paradigm is often application dependent.

On-line analytical processing (OLAP) is a database-oriented paradigm that uses a multidimensional database where each of the dimensions is an independent factor, e.g., product vs. customer name vs. date. There are a variety of operators provided that are most easily understood if one assumes a three-dimensional space in which each factor is a dimension of a vector within a three-dimensional cube. One may use "pivoting" to rotate the cube to see any desired pair of dimensions. "Slicing" involves a subset of the cube by fixing the value of one dimension. "Roll-up" employs higher levels of abstraction, e.g. moving from concentrations-by-region to concentrations-by-continent, and "drill-down" goes to lower levels, e.g. moving from concentrations-by-geologic unit-by region to concentrations-by-geologic unit-by deposit. The Data Cube operation computes the power set of the "Group by" operation provided by SQL. For example, given a three dimension cube with dimensions A, B, C, then Data Cube computes Group by A, Group by B, Group by C, Group by A,B, Group by A,C, Group by B,C, and Group by A,B,C. OLAP is used by human operators to discover previously undetected knowledge in the database.

Recall that classification rules involve predicting attributes and the goal attribute. Induction on classification rules involves specialization, i.e. adding condition to the rule antecedent, and generalization, i.e. removing a condition from the antecedent. Hence, induction involves selecting what predicting attributes will be used. A decision tree is built by selecting the predicting attributes in a particular order, e.g., type of rock, concentration of lead, concentration of zinc. The decision tree is built top-down assuming all records are present at the root and are classified by each attribute value going down the tree until the value of the goal attribute is determined. The tree is only as deep as necessary to reach the goal attribute. For example, if no rocks from the Carlin, Nev. gold deposits have a particular chemical signature A, then the value of the goal attribute "Chemical signature A?" would be determined (value equals "No") once the deposit area is known as the Carlin, Nevada gold deposits. However, if the rock sample is from a different deposit, such as Papua New Guinea, it may be necessary to look at other predicting attributes to determine the value of the goal attribute. A human is often involved in selecting the order of attributes to build a decision tree based on "intuitive" knowledge of which attribute is more significant than other attributes.

Decision trees can become quite large and often require pruning, i.e. cutting off lower level subtrees. Pruning avoids "overfitting" the tree to the data and simplifies the discovered knowledge. However, pruning too aggressively can result in "underfitting" the tree to the data and missing some significant attributes.

The above techniques provide tools for a human to manipulate data until some significant knowledge is discovered and removes some of the human expert knowledge interference from the classification of values. Other techniques rely less on human intervention. Instance-based learning involves predicting the value of a tuple, e.g., predicting if someone of a particular age and gender will buy a product, based on stored data for known tuple values. A distance metric is used to determine the values of the N closest neighbors, and these known values are used to predict the unknown value. For example, given a particular type of rock and concentration of an element in which the tuple value is not known, if among the 20 nearest neighbors, 15 samples showed a particular chemical signature and S samples did not, then it might be predicted that the value of this new tuple would be "has chemical signature A". This technique does not discover any new rules, but it does provide an explanation for the classification, namely the values of the closest neighbors.

The final technique examined is neural nets. A typical neural net includes an input layer of neurons corresponding to the predicting attributes, a hidden layer of neurons, and an output layer of neurons that are the result of the classification. For example, there may be eight input neurons corresponding to "under 0.25% concentration", "between 0.25% and 0.45% concentration", "over 0.45% concentration", "from Carlin, Nev.", "from shale above the deposit", "from shale below the deposit", and "from the gold bearing organic material within the deposit". There could be two output neurons: "has chemical signature A" and "does not have chemical signature A". A reasonable number of neurons in the middle layer is determined by experimenting with a particular known data set. There are interconnections between the neurons at adjacent layers that have numeric weights. When the network is trained, meaning that both the input and output values are known, these weights are adjusted to given the best performance for the training data. The "knowledge" is very low level (the weight values) and is distributed across the network. This means that neural nets do not provide any comprehensible explanation for their classification behavior-they simply provide a predicted result. Neural nets may take a very long time to train, even when the data is deterministic. For example, to train a neural net to recognize an exclusive-or relationship between two Boolean variables may take hundreds or thousands of training data (the four possible combinations of inputs and corresponding outputs repeated again and again) before the neural net learns the circuit correctly. However, once a neural net is trained, it is very robust and resilient to noise in the data. Neural nets have proved most useful for pattern recognition tasks, such as recognizing handwritten digits in a zip code.

Other knowledge discovery paradigms can be used, such as genetic algorithms. However, the above discussion presents the general issues in knowledge discovery. Some techniques are heavily dependent on human guidance while others are more autonomous. The selection of the best approach to knowledge discovery is heavily dependent on the particular application.

Data Warehousing

The above discussions focused on data mining tasks and knowledge discovery paradigms. There are other components to the overall knowledge discovery process.

Data warehousing is the first component of a knowledge discovery system and is the storage of raw data itself. One of the most common techniques for data warehousing is a relational database. However, other techniques are possible, such as hierarchical databases or multidimensional databases. Data is nonvolatile, i.e. read-only, and often includes historical data. The data in the warehouse needs to be "clean" and "integrated". Data is often taken from a wide variety of sources. To be clean and integrated means data is represented in a consistent, uniform fashion inside the warehouse despite differences in reporting the raw data from various sources. There also has to be data summarization in the form of a high level aggregation. For example, consider a phone number 111-222-3333 where 111 is the area code, 222 is the exchange, and 3333 is the phone number. The telephone company may want to determine if the inbound number of calls is a good predictor of the outbound number of calls. It turns out that the correlation between inbound and outbound calls increases with the level of aggregation. In other words, at the phone number level, the correlation is weak but as the level of aggregation increases to the area code level, the correlation becomes much higher.

Data Pre-processing

After the data is read from the warehouse, it is pre-processed before being sent to the data mining system. The two pre-processing steps discussed below are attribute selection and attribute discretization.

Selecting attributes for data mining is important since a database may contain many irrelevant attributes or the purpose of data mining, and the time spent in data mining can be reduced if irrelevant attributes are removed beforehand. Of course, there is always the danger that if an attribute is labeled as irrelevant and removed, then some truly interesting knowledge involving that attribute will not be discovered.

If there are N attributes to choose between, then there are $2^N$ possible subsets of relevant attributes. Selecting the best subset is a nontrivial task. There are two common techniques for attribute selection. The filter approach is fairly simple and independent of the data mining technique being used. For each of the possible predicting attributes, a table is made with the predicting attribute values as rows, the goal attribute values as columns, and the entries in the table as the number of tuples satisfying the pairs of values. If the table is fairly uniform or symmetric, then the predicting attribute is probably irrelevant. However, if the values are asymmetric, then the predicting attribute may be significant.

The second technique for attribute selection is called a wrapper approach where attribute selection is optimized for a particular data mining algorithm. The simplest wrapper approach is Forward Sequential Selection. Each of the possible attributes is sent individually to the data mining algorithm and its accuracy rate is measured. The attribute with the highest accuracy rate is selected. Suppose attribute 3 is selected; attribute 3 is then combined in pairs with all remaining attributes, i.e., 3 and 1, 3 and 2, 3 and 4, etc., and the best performing pair of attributes is selected. This hill climbing process continues until the inclusion of a new attribute decreases the accuracy rate. This technique is relatively simple to implement, but it does not handle interaction among attributes well. An alternative approach is backward sequential selection that handles interactions better, but it is computationally much more expensive.

Discretization involves grouping data into categories. For example, age in years might be used to group persons into categories such as minors (below 18), young adults (18 to 39), middle-agers (40–59), and senior citizens (60 or above). Some advantages of discretization is that it reduces the time for data mining and improves the comprehensibility of the discovered knowledge. Categorization may actually be required by some mining techniques. A disadvantage of discretization is that details of the knowledge may be suppressed.

Blindly applying equal-weight discretization, such as grouping ages by 10 year cycles, may not produce very good results. It is better to find "class-driven" intervals. In other words, one looks for intervals that have uniformity within the interval and have differences between the different intervals.

Data Post-processing

The number of rules discovered by data mining may be overwhelming, and it may be necessary to reduce this number and select the most important ones to obtain any significant results. One approach is subjective or user-driven. This approach depends on a human's general impression of the application domain. For example, the human user may propose a rule such as "if a region has more sandstone, then the region has a lower chance of having gold deposits". The discovered rules are then compared against this general impression to determine the most interesting rules. Often, interesting rules do not agree with general expectations. For example, although the conditions are satisfied, the conclusion is different than the general expectations. Another example is that the conclusion is correct, but there are different or unexpected conditions.

Rule affinity is a more mathematical approach to examining rules that does not depend on human impressions. The affinity between two rules in a set of rules $\{R_i\}$ is measured and given a numerical affinity value between zero and one, called $Af(R_x, R_y)$. The affinity value of a rule with itself is always one, while the affinity with a different rule is less than one. Assume that one has a quality measure for each rule in a set of rules $\{R_i\}$, called $Q(R_i)$. A rule $R_j$ is said to be suppressed by a rule $R_k$ if $Q(R_j) < Af(R_j, R_k) * Q(R_k)$. Notice that a rule can never be suppressed by a lower quality rule since one assumes that $Af(R_j, R_k) < 1$ if $j^1 k$. One common measure for the affinity function is the size of the intersection between the tuple sets covered by the two rules, i.e. the larger the intersection, the greater the affinity.

Data Mining Summary

The discussion above has touched on the following aspects of knowledge processing: data warehousing, pre-processing data, data mining itself, and post-processing to obtain the most interesting and significant knowledge. With large databases, these tasks can be very computationally intensive, and efficiency becomes a major issue. Much of the research in this area focuses on the use of parallel processing. Issues involved in parallelization include how to partition the data, whether to parallelize on data or on control, how to minimize communications overhead, how to balance the load between various processors, how to automate the parallelization, how to take advantage of a parallel database system itself, etc.

Many knowledge evaluation techniques involve statistical methods or artificial intelligence or both. The quality of the knowledge discovered is highly application dependent and inherently subjective. A good knowledge discovery process should be both effective, i.e. discovers high quality knowledge, and efficient, i.e. runs quickly.

Integrating Spatial Analysis Including Global Positioning and Discovery Based Data Mining Analysis to Ascertain the Relationships Between Collected Samples and Geology with Remotely Sensed Data As noted above, geoscientists desire a form of data analysis that discovers relationships between geological samples collected in the field and the aerial data gathered during geophysical or geochemical surveying or remote sensing of the region from which the samples were collected.

The search for natural resources and the remediation of surface and subsurface contaminants requires a great deal of analysis of samples for chemical, physical and mineralogical attributes as well as attributes representing physical properties of materials sensed over the surface by the use of remote techniques such as geochemistry, geophysics and imaging. Data collection is costly, and the analysis of diverse data from different sources is difficult. The relative positions of anomalous chemical values within specific geologies or the relative position of a geophysical, geochemical or imaging anomaly can be very important in the discovery of new natural resources or sites of surface and subsurface contamination as well as the extension of known occurrences. By taking advantage of the realization that the many databases owned by a geo-services company contain locational information which will allow the colocation of these data, the present invention integrates spatial analysis methodologies with data mining methodologies to discover hidden patterns within the co-located data that lead to the location of more prospective areas to expend dollars to cover very expensive drilling of the area. This integration of methodologies helps solve the problem of correlating data from diverse sources.

Discovery-based data mining allows for the understanding of the relationships between diverse data types. Patterns in chemical values within a geological environment can be related to a variety of geophysical signatures and the model can be replicated to find similar occurrences. As noted above in the description of general data mining techniques, data mining alone may provide interesting relationships. For example, data mining within a database of data from analyzed surface rock samples may reveal a rule such as increased radioactivity of the rocks within region "X" coincides with increased concentrations of silver. However, data mining alone cannot provide further information concerning relationships between the locations of the anomalies and where one should drill to gather rock samples to validate the prediction. A geoscientist may be interested to know that the samples that showed increased radioactivity tend to be located in several small subregions that lie near a linear remotely sensed feature running through the region which has not been heretofore identified as a potential mineral vein because no veins of that type had been seen in these rocks in the past.

Spatial analysis allows for the relative locations of these data to be addressed. An oil company may collect significant amounts of data using a variety of well-logging instruments in which a well is drilled, an instrument is lowered into the well, and the instrument is slowly pulled to the surface while data is collected from the instrument. The company may collect data throughout a region by drilling several wells in a region. With a scarcity of data in certain subregions, a modeling tool provides some predictive capability to the known values by creating intermediate values. Using different types of spatial analysis techniques, values between the wells may be predicted, and a three-dimensional model of the region that shows various characteristics in the data may then be constructed in order to predict unknown values between the known values.

By employing a global positioning system (GPS), a database will store accurate positions of samples when collected as well as geological information and remotely sensed data such that an analysis of the relationship of all data points to each other can be accomplished. This allows for a more efficient and more accurate location for additional sampling and also allows for undiscovered natural resources to be more easily delineated.

Accurate positioning of data collection points is essential to the integration of all of these techniques. When a geological sample is collected, e.g., from a drilled well core, from surface rocks, from an oil reservoir, etc., GPS data for the sample's location must also be collected to accurately locate the sample. After the sample is analyzed, the location of the sample may be stored with the characteristic data from the physical and chemical analysis. When regional data is collected, e.g., from an airborne data survey for magnetics or from a satellite that can produce various types of recorded spectra, all of the individual data points from the data survey can be placed digitally within a three-dimensional coordinate space. The coordinates of the physical sample data may then be accurately overlaid with the coordinates of the survey data, and the data relationships between the different sets of data may be data mined for relationships between data point characteristics.

Generally, when digital survey data is analyzed, the data is smoothed to eliminate noise while preserving larger trends in the data that may indicate potentially interesting anomalies, which in turn may be selected as geologically significant features. However, in the case of the present invention, the individual data points from the survey data are not disturbed. The alignment of sample data and survey data may provide fine correlations that appear when doing discovery-based data mining.

Figure 3:
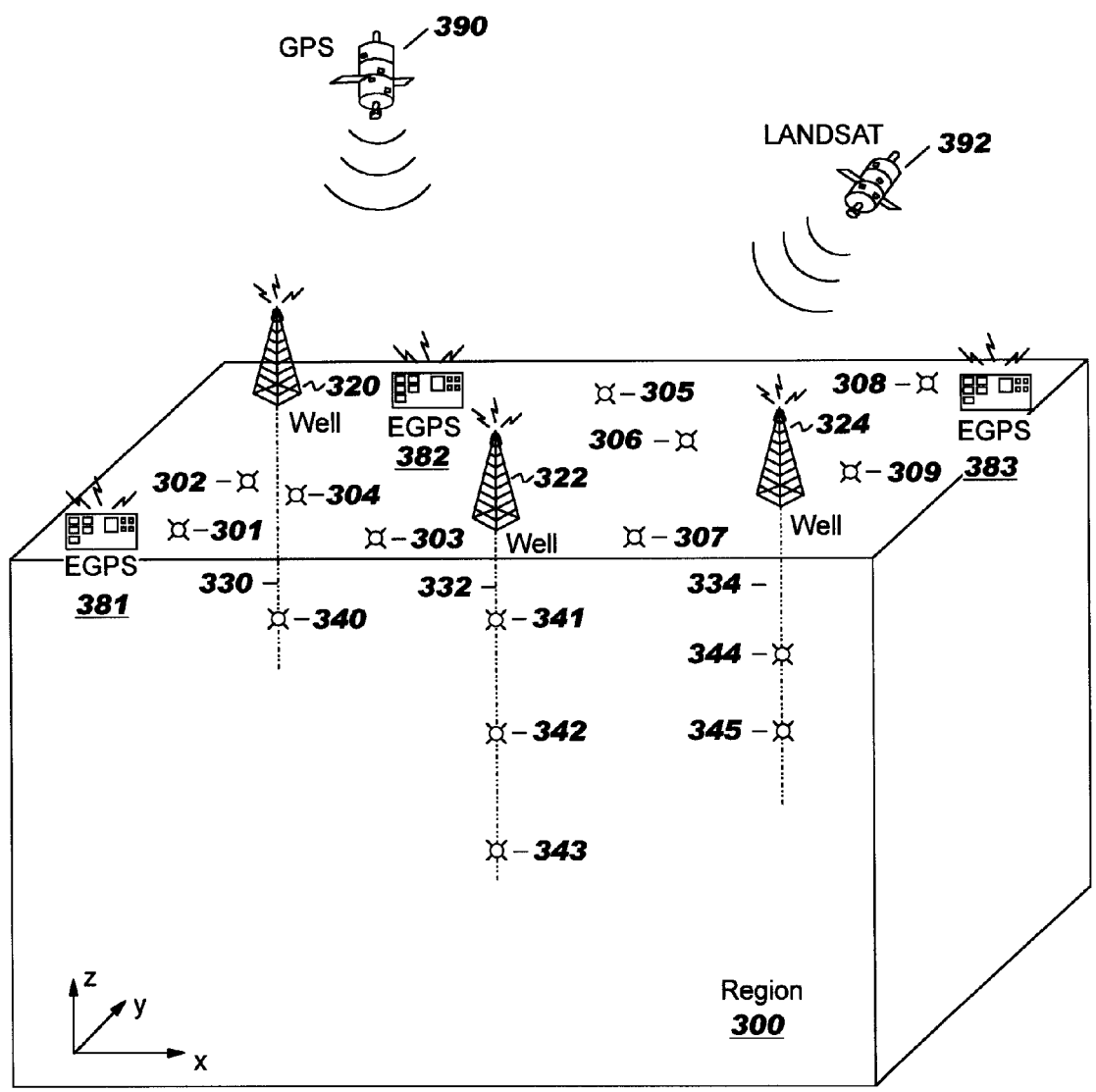
FIG. 3 is a diagram that depicts various geological objects upon which a geoservices company may gather information, including spatial information, for ascertaining relationships between data points.

With reference to FIG. 3, a diagram depicts various geological objects upon which a geoservices company may gather information, including spatial information, for ascertaining relationships between data points. Region 300 is located within a three-dimensional (x,y,z) coordinate space in which physical samples are collected in addition to raw data. Region 300 may include both solid and gaseous portions, i.e. both the lithosphere and the atmosphere. The coordinate values within region 300 are provided by a position identifying system, such as that provided by GPS satellite 390 usually integrated with ground based transmitters to allow for greater accuracy of locations. If a GPS signal is adequately strong and accurate, the GPS signals provided by the network of GPS satellites may be relied upon as the sole position determinant within region 300. However, this is usually not the case do to purposely induced interferences with the transmissions that inhibit the use of these transmissions as the sole accurate location of a point in space. Alternatively, local positioning transmitters, such as Enhanced GPS (EGPS) transmitters 381–383, may be deployed within a region to assist in determining a precise location. The position identifying system used throughout the present invention may vary, and the examples provided above should not be interpreted as limitations with respect to the present invention.

Surface, near-surface, and sub-surface collection points 301–309 may be used to collect data samples or physical samples of rocks, minerals, fluids, plants, etc. As these samples are collected, GPS positioning equipment may be used to determine the precise location of collection. A physical sample may be inventoried in an appropriate manner so that the physical sample may be associated with collection information, such as the location of the collection, the manner in which it was collected, conditions under which it was collected, etc. The collection information is subsequently stored into a database, and the physical samples are analyzed at some point in time to generate physical characteristic data for storage in a database.

Well drilling equipment 320–324 may drill wells 330–334 and may have associated GPS receivers by which a precise position of each well may be established. Depth ranging equipment may be used in conjunction with the GPS signals to establish the depth of positions within wells, and the depth values are used to establish the position of collection points and instrumentation points within the region. Although several well points and several surface points are shown as data collection points within FIG. 3, any point within region 300 may be appropriate for collecting data, which may include mines, caves, mountains, man-made elevated structures, etc.

Collection points 340–345 may be used within the wells to collect instrumentation data and physical samples. The type of physical sample retrieved from each collection point depends on the matter available to be retrieved and the purpose of the well. For example, if well 332 contains fluids, such as oil or groundwater, then fluids may be collected in addition to the minerals at each collection point. If well drilling equipment 322 is able to retrieve core samples, then a solid rock sample may be retrieved. In some situations, gases within the layered beds of rocks may also be collected for later analysis.

After bringing the collected samples to the surface, the samples may be cataloged into a database with related information concerning the method of collecting the sample, the location of the collection point of the sample, etc. The physical samples, including samples from collection points within wells and from surface or sub-surface collections points, may then be analyzed for a variety of physical properties. After determining the values of these properties, the values are stored into a database for subsequent spatial and data mining analysis. The database may be the same database that contains the collection information or could be an alternative database which contains only physical analysis data. In this manner, physical characteristics of a region at particular points within the region may be determined, and data values representing these physical characteristics are stored in one or more databases.

In addition to collecting samples within the wells, various types of instruments may be put into the wells to collect data. The type of data collected from these instruments depends on the instrumentation and purpose of the well. Typical well-logging instruments include wireline tools in which a tool is lowered by cable into the well and then slowly pulled to the surface while taking instrument readings, such as radioactivity measurements and seismic reflections. In this manner, physical characteristics of a region along particular paths within the region may be determined, and data values representing these physical characteristics are stored in one or more databases.

In addition to the collection of physical samples and the collection of instrumentation data within a well, instrumentation data may be collected at various collection points on the surface or near the surface. Stationary instruments may be used to capture data at solitary collection points, and the captured data may be single data items, such as the temperature at a given point at a given time, or multiple data items, such as survey-type data that covers a particular sub-region. For example, a vehicle-based, stationary seismic recorder may record seismic data over time at a particular point and then move to a different location to record additional data. Instruments which move with respect to the region may be used to capture data over an area, such as an airplane or a LANDSAT-type satellite, such as satellite 392. These types of instruments may record magnetics, gravity, etc., over a region or a sub-region. The data collected at a collection point or over an area or sub-region may also be termed "remotely sensed data" as physical samples are not collected and physical contact is not required in order to determine a physical property or condition at the data collection point.

Figure 4:
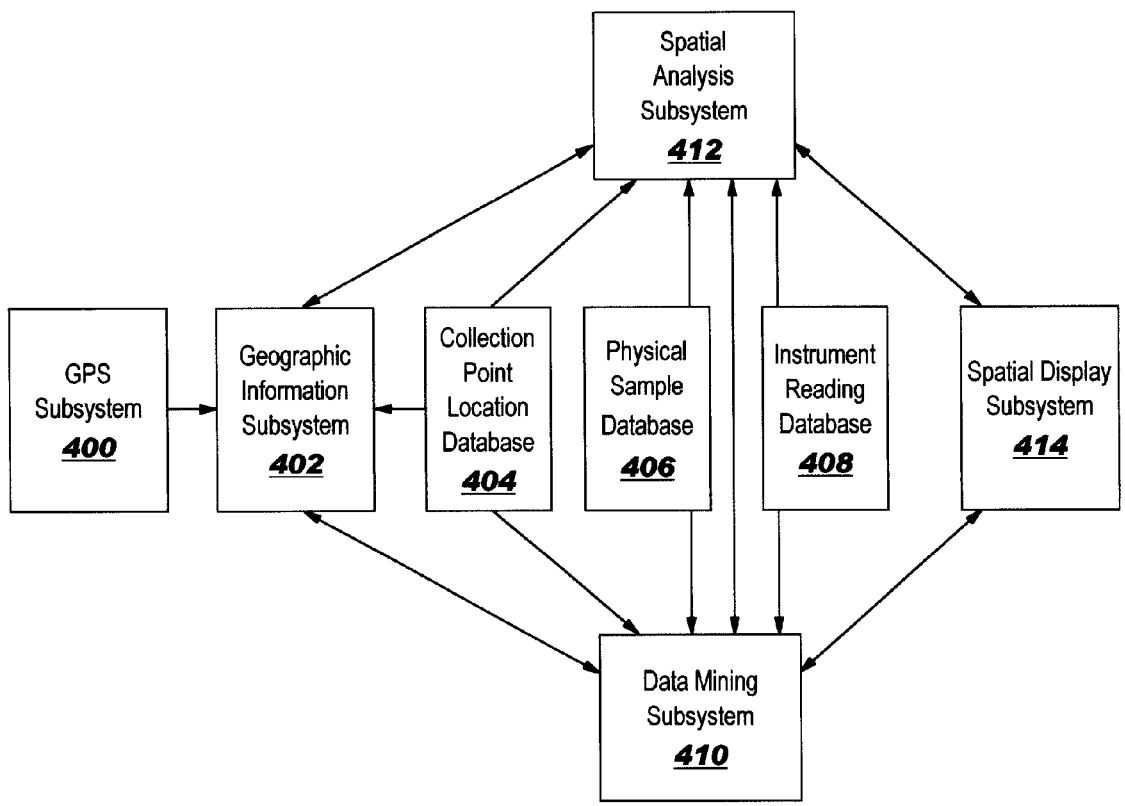
FIG. 4 is a block diagram depicting the components that may be used in a data processing system implementing the present invention.

With reference now to FIG. 4, a block diagram depicts the components that may be used in a data processing system implementing the present invention. GPS subsystem 400 provides a precise location of a collection point of a physical sample or of an instrument reading within a region. Geographic Information Subsystem (GIS) 402 uses the positioning information from the GPS subsystem to correlate the positions of the collection points within a region as stored within collection point location database 404, which may store both the collection point locations of physical samples and of instrument readings.

Collection point location database 404 may contain GPS coordinates of a collection point and other associated information. Physical sample database 406 may contain information associated with the manner in which physical samples were collected. Physical sample database 406 may also contain information associated with the physical properties of physical samples—after scientific analysis, data values of these properties may by stored for later retrieval. Instrument reading database 408 contains data values generated by field instruments that measure a particular condition at a collection point within a region. The field instruments may collection a single datum at a collection point, or the field instruments may move relative to the region in order to collect data over an area.

Data mining subsystem 410 uses collection point location database 404, physical sample database 406, and instrument reading database 408 to discover relationships between the collected physical samples and the collected instrument data. Spatial analysis subsystem 412 uses collection point location database 404, physical sample database 406, and instrument reading database 408 to process, plot, and display spatial information.

GIS 402, data mining subsystem 408, and spatial analysis subsystem 412 transfer information as appropriate. GIS 402 may process position information as necessary for either spatial analysis subsystem 412 or data mining subsystem 408. Spatial analysis subsystem 412 receives relationship data from data mining subsystem 410 for plotting and displaying spatial relationships and may return feedback information concerning spatial relationships to data mining subsystem 408. Spatial analysis subsystem 412 and data mining subsystem 408 may provide results to spatial display subsystem 414 that incorporates the results into various display for human interpretation and viewing.

Other databases may be provided, or the databases above may be combined in alternate arrangements of information. The example databases provided above are not meant to be interpreted as limitations with respect to the present invention.

A process for integrating spatial analysis with data mining will now be dicussed. The process begins with precise determination of locations of physical sample collections points within a region using GPS information. The physical samples are then analyzed for values of physical properties to be stored in association with their locations. Data values from instrument readings taken at collection points (or collection areas) within the region are stored in association with their locations. These databases are then mined using data mining algorithms to find relationships among instrument readings and the physical properties of physical samples. Potentially valuable data relationships are then processed through spatial analysis to determine whether the location of physical samples within the region confirm or contradict interesting anomalies within the instrument data.

Spatial analysis of the collected data may include the use of geostatistical algorithms that allow for the prediction of intermediate values for the data or may allow for the addition or subtraction of data layers or themes one from the other. The resulting maps of the data analysis would illustrate the most prospective area or volume to concentrate either more physical sampling on the surface or additional drilling of the subsurface to define a mineral deposit. The technique of integrating the results of data mining with spatial analysis is less sensitive to the bias that may be applied by the expert and allow for the discovery of unknown spatial patterns that occur with respect to the collected data and the location of an economically viable mineral deposit. This integration of data layers may also provide the information that would be necessary to make a decision to release a project area without further work being done. Without the geologic, geochemical, geophysical, and remotely sensed data being accurately positioned using either GPS or Enhanced GPS using supplementary ground stations and then the use of data mining to accurately relate the data points one to another, the data warehouse to hold all the data values and their relative location values, the spatial analysis of the data would not be possible nor of value.

The advantages of the present invention should be apparent in view of the detailed description provided above. One can conclude that the need for a tool to assess spatial relationships of physical samples and remotely sensed physical characteristics allows for the assessment of a diverse collection of data to be assessed with reference to relative locations. The present invention can shorten the time to discovery of new natural resources or to the location and potential migration of subsurface contaminants as well as guarantee that hidden relationships within the data will not be ignored which would allow for the discovery of a mineral deposit that has not been discovered because of expert bias.

Global positioning allows for the accurate positioning of the data collection that will be used in the spatial analysis and discovery-based data mining. This assessment is very difficult without collocating these data points on a map and observing the resulting patterns. However, with large amounts of data, the potential for the overshadowing of delicate relationships by more bold and less important relationships is possible. Discovery-based data mining algorithms may be used to address: the association of samples; geology and geophysical anomalies; the segmentation of the attributes associated with a known occurrence using demographic clustering; binary tree and neural net tree classification of relationships between geophysical and imaging anomalies and the sample chemistry and geology to predict and score the classes of prospects for additional resource or contamination; and the use of radial basis function analysis to predict and segment the attributes of a valid location for additional resource or contamination. With the combination of these techniques, it is possible to integrate geochemical, geological, and remote sense technologies in a way that will allow the discovery of hidden additional natural resources or contamination. Data is turned to knowledge, and that knowledge is used to more efficiently discover hidden resources and sources of environmental contamination.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for determining data relationships of physical sample data and remotely sensed data within a region, the method comprising the computer-implemented steps of:

identifying locations of physical samples within the region;

recording data associated with physical characteristics of the physical samples;

identifying locations for obtaining remotely sensed data within the region;

recording remotely sensed data; and associating the locations of physical samples within the region with the locations of remotely sensed data to form a set of spatial relationships.

2. The method of claim 1 further comprising:

employing data mining algorithms to generate input data for formulation of a set of spatial relationships.

3. The method of claim 1 further comprising:

employing spatial analysis algorithms to form the set of spatial relationships.

4. The method of claim 1 wherein the physical sample locations and the locations for obtaining remotely sensed data are determined through a position identifying system.

5. The method of claim 1 wherein the position identifying system comprises a global positioning system or enhanced global positioning system.

6. The method of claim 1 further comprising:

analyzing the physical samples to generate data values associated with physical characteristics of the physical samples.

7. A data processing system for determining data relationships of physical sample data and remotely sensed data within a region, the data processing system comprising:

first identifying means for identifying locations of physical samples within the region;

first recording means for recording data associated with physical characteristics of the physical samples;

second identifying means for identifying locations for obtaining remotely sensed data within the region;

second recording means for recording remotely sensed data; and associating means for associating the locations of physical samples within the region with the locations of remotely sensed data to form a set of spatial relationships.

8. The data processing system of claim 7 further comprising:

employing means for employing data mining algorithms to generate input data for forming the set of spatial relationships.

9. The data processing system of claim 7 further comprising:

employing means for employing spatial analysis algorithms to form the set of spatial relationships.

10. The data processing system of claim 7 wherein the physical sample locations and the locations for obtaining remotely sensed data are determined through a position identifying system.

11. The data processing system of claim 7 wherein the position identifying system comprises a global positioning system.

12. The data processing system of claim 7 further comprising:

analyzing means for analyzing the physical samples to generate data values associated with physical characteristics of the physical samples.

13. A computer program product on a computer-readable medium for use in a data processing system for determining data relationships of physical sample data and remotely sensed data within a region, the computer program product comprising:

instructions for identifying locations of physical samples within the region;

instructions for recording data associated with physical characteristics of the physical samples;

instructions for identifying locations for obtaining remotely sensed data within the region;

instructions for recording remotely sensed data; and instructions for associating the locations of physical samples within the region with the locations of remotely sensed data to form a set of spatial relationships.

14. The computer program product of claim 13 further comprising:

instructions for employing data mining algorithms to generate input data for forming the set of spatial relationships.

15. The computer program product of claim 13 further comprising:

instructions for employing spatial analysis algorithms to form the set of spatial relationships.

16. The computer program product of claim 13 wherein the physical sample locations and the locations for obtaining remotely sensed data are determined through a position identifying system.

17. The computer program product of claim 13 wherein the position identifying system comprises a global positioning system.

18. The computer program product of claim 13 further comprising:

instructions for analyzing the physical samples to generate data values associated with physical characteristics of the physical samples.

* * * * *